No. 691,185. Patented Jan. 14, 1902.
W. A. SCHLEICHER.
SNAP HOOK.
(Application filed June 14, 1898.)

(Model.)

WITNESSES
Warren W. Swartz
George B. Blemming

INVENTOR
William A. Schleicher
by Bakewell & Bakewell
his Attorneys.

THE NORRIS PETERS CO., PHOTO-LITHO., WASHINGTON, D. C.

UNITED STATES PATENT OFFICE.

WILLIAM A. SCHLEICHER, OF CLEVELAND, OHIO.

SNAP-HOOK.

SPECIFICATION forming part of Letters Patent No. 691,185, dated January 14, 1902.

Application filed June 14, 1898. Serial No. 683,414. (Model.)

*To all whom it may concern:*

Be it known that I, WILLIAM A. SCHLEICHER, of Cleveland, county of Cuyahoga, and State of Ohio, have invented a new and useful Improvement in Snap-Hooks, of which the following is a full, clear, and exact description, reference being had to the accompanying drawings, forming part of this specification, in which—

Figure 1:
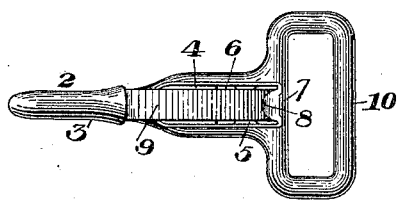
Figure 2:
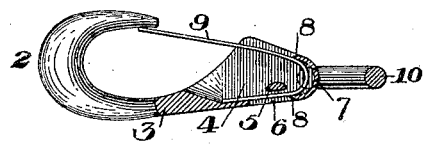
Figure 3:
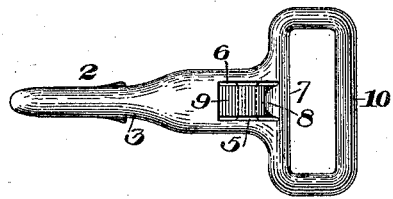

Figure 1 is a top plan view of my improved snap-hook. Fig. 2 is a sectional side elevation of the same, and Fig. 3 is a bottom plan view.

My invention relates to that type of snap-hooks wherein a U-shaped spring is seated in a chamber in the shank of the hook, the longer leg of the U extending beneath the nose of the hook, and it is designed to improve the means for fastening the U-shaped spring in place, whereby the hook may be more readily cast and the spring prevented from being forced out of place.

In the drawings, 2 represents the snap-hook, having its shank 3 provided with the chamber 4, having the transverse pin 5 located above the hole 6 in the floor of this chamber. The rear end of the chamber is formed by a wall 7, which at its upper and lower ends is provided with lips 8 8. These lips are cast upright with the hook, and after the spring is placed in the chamber, with its lower short leg beneath the cross-pin, the lips are bent into the position shown, so as to engage and secure the spring-tongue in place. The chamber in the shank is made of the proper width to receive the spring 9 snugly between its sides, these sides extending above its edges, as shown.

10 is the usual loop at the end of the shank.

The advantages of my invention result from the doing away with the lips heretofore employed, which projected inwardly from the sides of the chamber over the top of the spring and which rendered it difficult to cast the hook and secure the spring therein. The upwardly and downwardly projecting lips at the end of the chamber are easily cast and bent into contact with the spring and securely hold it in its proper position.

I claim—

1. A snap-hook having a shank provided with a chamber, a cross-bar within the chamber, a U-shaped spring having one leg beneath the cross-bar, and a lip projecting from the rear wall of the chamber and arranged to contact with the spring; substantially as described.

2. A snap-hook having a shank provided with a chamber, a cross-bar within the chamber, a U-shaped spring having one leg beneath the cross-bar, and upper and lower lips projecting forwardly from the rear wall of the chamber; substantially as described.

3. A snap-hook having its shank provided with a chamber having an open top and bottom, the rear end of the chamber being closed, and having thin lips cast integrally therewith and projecting forwardly, an integral cross-pin within the lower portion of the chamber, and a plain U-shaped spring having its lower leg held under the cross-bar and secured by the lips of the rear wall, which are bent inwardly into contact with its curved portion; substantially as described.

In testimony whereof I have hereunto set my hand.

WILLIAM A. SCHLEICHER.

Witnesses:
JNO. H. BAEHR,
EMIL W. JAITE.